(12) United States Patent
Koyama et al.

(10) Patent No.: US 10,511,339 B2
(45) Date of Patent: Dec. 17, 2019

(54) CIRCUIT AND ELECTRONIC EQUIPMENT

(71) Applicant: NOVARS INC., Tokyo (JP)

(72) Inventors: Kazuhiro Koyama, Chiba (JP);
Akihiro Okabe, Tokyo (JP); Tetsuya Nobe, Tokyo (JP)

(73) Assignee: NOVARS INC., Tokyo (JP)

( * ) Notice: Subject to any disclaimer, the term of this patent is extended or adjusted under 35 U.S.C. 154(b) by 0 days.

(21) Appl. No.: 16/133,973

(22) Filed: Sep. 18, 2018

(65) Prior Publication Data

US 2019/0020368 A1    Jan. 17, 2019

Related U.S. Application Data

(60) Division of application No. 15/904,456, filed on Feb. 26, 2018, now Pat. No. 10,128,889, which is a continuation of application No. PCT/JP2016/077477, filed on Sep. 16, 2016.

(30) Foreign Application Priority Data

Sep. 17, 2015  (JP) ................................. 2015-184076

(51) Int. Cl.
*H04B 1/3883*  (2015.01)
*H02J 7/00*    (2006.01)

(52) U.S. Cl.
CPC .............. *H04B 1/3883* (2013.01); *H02J 7/00* (2013.01); *H02J 7/0045* (2013.01); *H02J 7/0047* (2013.01)

(58) Field of Classification Search
CPC ................................. H04B 1/3883; H02J 7/00
See application file for complete search history.

(56) References Cited

U.S. PATENT DOCUMENTS

2010/0141153 A1 * 6/2010 Recker ............... H05B 33/0803
                                                    315/149

FOREIGN PATENT DOCUMENTS

JP       2004-228663    *  8/2004    ............... H04B 7/26

* cited by examiner

*Primary Examiner* — Tuan H Nguyen
(74) *Attorney, Agent, or Firm* — Nakanishi IP Associates, LLC

(57) ABSTRACT

A cell type power supply device includes: a housing having a shape and dimensions based on a cell standard; a cell holder including an inner positive terminal and an inner negative terminal that are brought into contact with front and rear terminals of the external cell held in the housing; an outer positive terminal connected to the inner positive terminal; an outer negative terminal connected to the inner negative terminal; an output transistor interposed between the inner negative terminal and the outer negative terminal or between the inner positive terminal and the outer positive terminal; a control circuit that generates a control signal of the output transistor in accordance with a signal received via an antenna; and a detection resister interposed between the inner negative terminal and the outer negative terminal or between the inner positive terminal and the outer positive terminal in parallel with the output transistor to change a voltage of the outer negative terminal or the outer positive terminal with respect to a reference voltage in accordance with ON/OFF of a power switch.

2 Claims, 12 Drawing Sheets

|  | First output transistor | | | | Second output transistor | | | | Third output transistor | | | | Fourth output transistor | | | | Detection transistor | | | |
|---|---|---|---|---|---|---|---|---|---|---|---|---|---|---|---|---|---|---|---|---|
|  | S | D | G | State | S | D | G | State | S | D | G | State | S | D | G | State | S | D | G | State |
| Power switch OFF | H | H | H | OFF | L | H | L | OFF | H | L | H | OFF | L | L | H | ON | H | L | H | OFF |
| Power switch ON | H | L | H | OFF | L | L | L | OFF | H | L | H | OFF | L | L | H | ON | H | H | L | ON |

CIRCUIT AND ELECTRONIC EQUIPMENT

CROSS-REFERENCE TO RELATED APPLICATIONS

This application is a divisional application of U.S. patent application Ser. No. 15/904,456 filed on Feb. 26, 2018, which is a continuation application of International Patent Application No. PCT/JP2016/077477 filed on Sep. 16, 2016, which is based upon and claims the benefit of priority from the prior Japanese Patent Application No. 2015-184076, filed Sep. 17, 2015, the entire contents of which are incorporated herein by reference.

TECHNICAL FIELD

The present invention relates to A cell type power supply device, circuit and electronic equipment.

BACKGROUND

There is a wireless system that enables wireless control of electric toys by being switched on. In such a system, power is supplied to a receiver drive circuit by attaching a cell in a wireless communication drive device or by turning on a power supply switch of the device main body after attaching the cell. After that, the electrifying condition is maintained and a current continues flowing unless the wireless communication drive device is taken out from a cell box and the cell is removed, or the power supply switch of the device main body is turned off.

Patent Literature 1 discloses a configuration in which an electric toy vehicle 100 holds in its cell holder a cell 50 and a box type wireless receiver drive storing a wireless receiver drive receiving substrate portion 20 including an antenna, a receiver IC, a tuning circuit, an amplifier circuit, an IC-controlled micro computer, and an IC motor driver, and an output terminal of the wireless receiver drive receiving substrate portion 20 is connected to an input terminal of a motor 107.

However, the literature does not include any technical description relating to power supply control of the wireless receiver drive, and leaves a problem that power supply cannot be stopped unless a power supply switch is provided in the device main body and a user operates this switch, and an external cell that is built in the wireless receiver drive is drained when the electric toy is not in use. To prevent the drain of the external cell when the electric toy is not in use, it is necessary to open the cell box of the electric toy, take out the wireless receiver drive, and further remove the external cell from the wireless receiver drive every time. Such a movable electric toy often employs a screw fixing lid for the cell box in consideration of safety, which causes more inconvenience. If the electric toy is left uncared, the cell will be dead when the electric toy is used for playing next time; therefore, a new cell needs to be prepared and replaced with. Such inconvenience has been obvious.

CITATION LIST

Patent Literature

[Patent Literature 1] Japanese Utility Model No. 3143765

SUMMARY OF INVENTION

Technical Problem

An object is to provide A cell type power supply device, circuit and electronic equipment that reduce the consumption speed of an external cell.

Solution to Problem

A cell type power supply device according to one embodiment of the present invention is attachable alone or in series with an other cell in a cell box of an external load device including a load, the cell box, and a power switch interposed between the load and the cell box. The cell type power supply device comprises: a housing having a shape and dimensions based on a cell standard; a cell holder that holds an external cell in the housing, and includes an inner positive terminal and an inner negative terminal that are brought into contact with front and rear terminals of the held external cell; an outer positive terminal provided on a front end surface of the housing and connected to the inner positive terminal; an outer negative terminal provided on a rear end surface of the housing and connected to the inner negative terminal; an output transistor interposed between the inner negative terminal and the outer negative terminal or between the inner positive terminal and the outer positive terminal; a control circuit that generates control signal of the output transistor in accordance with an RF signal received from an external information device via an antenna; and a detection resister interposed between the inner negative terminal and the outer negative terminal or between the inner positive terminal and the outer positive terminal in parallel with the output transistor to change a voltage of the outer negative terminal or the outer positive terminal with respect to a reference voltage in accordance with ON/OFF of the power switch.

An electronic equipment according to one embodiment of the present invention comprises: a load; a power supply box that holds a power supply; a power switch interposed between the load and the power supply box; a power switch detection unit that detects ON/OFF of the power switch; a circuit cutoff/conduction unit that cuts or allows electrical connection between the load and the power supply box in accordance with a control signal; and a control unit that generates the control signal in accordance with an RF signal received from an external information device via an antenna, wherein the control unit switches between ON and OFF of a transmitting/receiving operation of the RF signal via the antenna in accordance with ON/OFF of the power switch which is detected by the power switch detection unit.

A circuit according to one embodiment of the present invention is configured with an external load, a power supply, and a power switch. The circuit comprises: a power switch detection unit that detects ON/OFF of the power switch; a circuit cutoff/conduction unit that cuts or allows electrical connection between the external load and the power supply in accordance with a control signal; and a control unit that generates the control signal in accordance with an RF signal received from an external information device via an antenna, wherein the control unit switches between ON and OFF of a transmitting/receiving operation of the RF signal via the antenna in accordance with ON/OFF of the power switch which is detected by the power switch detection unit.

BRIEF DESCRIPTION OF DRAWINGS

FIG. 14 is a diagram showing a terminal voltage level of each transistor which changes in accordance with ON/OFF of the power switch of FIG. 13.

DESCRIPTION OF PREFERRED EMBODIMENTS

Figure 1:
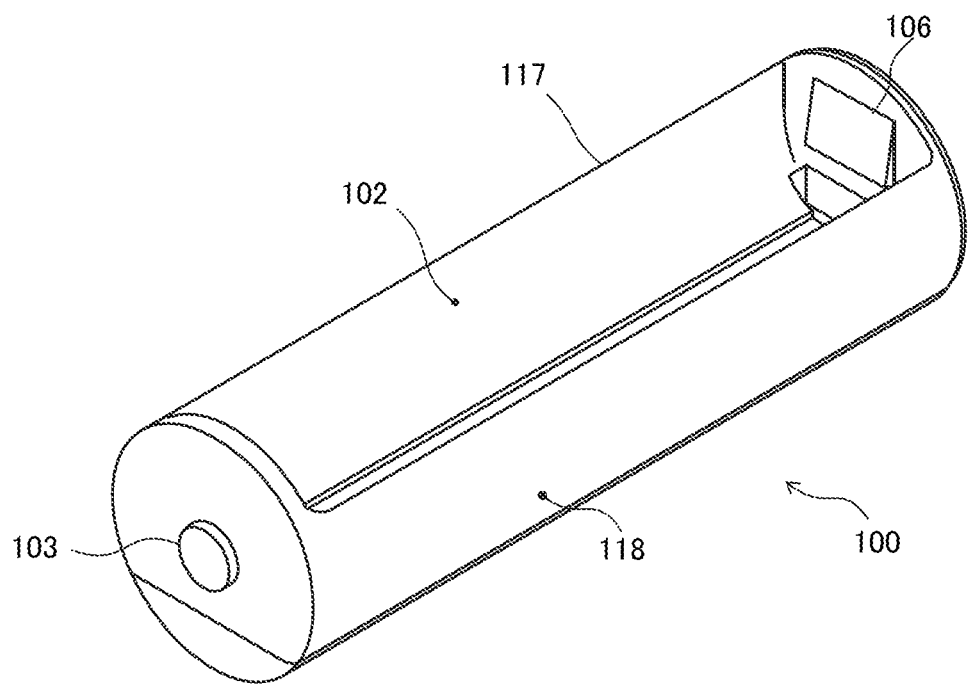
FIG. 1 is a perspective view showing an exterior of A cell type power supply device according to a first embodiment.

Hereinafter, A cell type power supply device 100 comprising a wireless function according to one embodiment of the present invention will be described with reference to the drawings. In the following description, structural elements having approximately the same function and configuration will be assigned with the same reference numeral, and redundant descriptions will be given only where necessary.

An object of the present embodiment is to provide A cell type power supply device, circuit and electronic equipment that can control ON/OFF of the cell type power supply device in accordance with a switch (such as a power switch) connected to the cell type power supply device even when the cell type power supply device is kept attached in the cell box. In addition, one of the objects is to provide a cell type power supply device, circuit and electronic equipment that can control ON/OFF of a transmitting/receiving operation of the cell type power supply device rather than turning on/off the cell type power supply device in accordance with an external power switch. One of the objects is to provide A cell type power supply device, circuit and electronic equipment that can detect ON or OFF of a switch (such as a power switch) in an electronic equipment and adjust the output to a load (such as wireless communication device or a power source). Furthermore, one of the objects is to provide a circuit, electronic equipment and power supply method that can prevent a CPU breakdown etc. caused by a counter electromotive voltage that occurs due to voltage level stabilization, a level shift, logical consistency, or a load.

Figure 2:
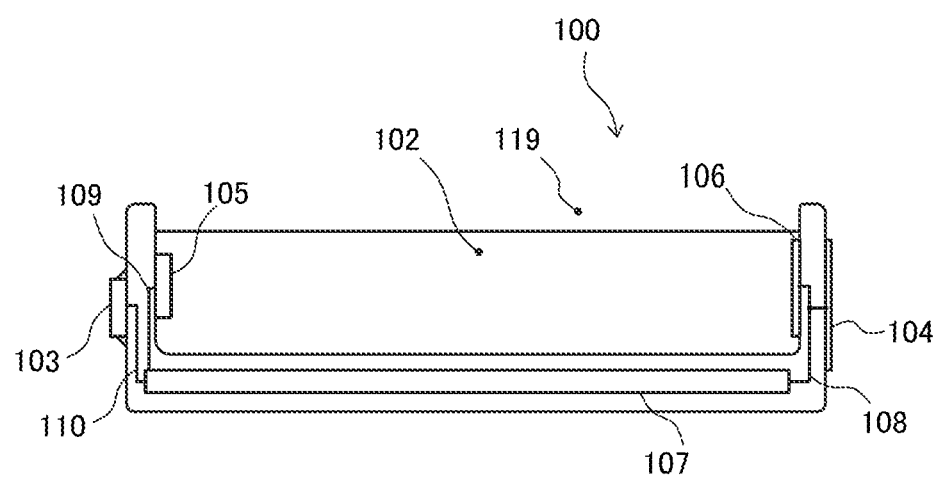
FIG. 2 is a diagram showing an internal structure of the cell type power supply device according to the first embodiment.

FIG. 1 is a perspective view showing an exterior of the cell type power supply device 100 having a wireless communication function according to a first embodiment. FIG. 2 is a diagram showing an internal structure of the cell type power supply device 100 according to the first embodiment. The cell type power supply device 100 having a wireless communication function according to the first embodiment (hereinafter, simply referred to as A cell type power supply device 100) has a shape and external dimensions based on a cell standard. Typically, the cell type power supply device 100 is made by a columnar body having a height and diameter based on the AA standard (the single cell). However, the cell type power supply device 100 may have a shape and dimensions based on another cell standard. Here, descriptions are provided on the assumption that the cell type power supply device 100 is based on the AA standard. The cell type power supply devices 100 according to the second to fifth embodiments also has the same shape and dimensions as those of the first embodiment.

A main body 117 of the cell type power supply device 100 is wrapped by a columnar housing 118 having the same shape and dimensions as those of the AA size cell standard. A circle conductive plate is attached as an outer positive terminal 103 at the center of a top surface (also referred to as a front end surface) of the main body 117. The terminal is also referred to as an electrode. A circle conductive plate is attached as an outer negative terminal 104 at the center of a bottom surface (also referred to as a rear end surface) of the main body. A portion of the peripheral surface of the housing 118 is cut in an oval shape. The length of the cut portion 119 is equal to that of AAA cells, and the width is a little larger than that of AAA cells. A user can insert an AAA cell into or remove it from a cell holder 102 through the cut portion 119. The shape of the cell holder 102 is a columnar space having a length and diameter based on the AAA standard. The central axis of the cell holder 102 is offset in a radial direction with respect to the columnar central axis of the cell type power supply device 100. This offset provides a small space between the housing 118 and the cell holder 102. In this small space, a substrate 107 that realizes various functions of the cell type power supply device 100 is mounted.

A conductive plate is attached as an inner positive terminal 105 at the center of the front end of the cell holder 102, i.e., on the same side as the outer positive terminal 103. A conductive plate having spring property is attached as an inner negative terminal 106 at the center of the rear end of the cell holder 102, i.e., on the same side as the outer negative terminal 104. The positive terminal of the AAA cell held in the cell holder 102 is brought into contact with the inner positive terminal 105, and the negative terminal of the AAA cell is brought into contact with the inner negative terminal 106. The inner negative terminal 106 is connected to the outer negative terminal 104 and the substrate 107 via a distribution cable 108. The inner negative terminal 106 and the outer negative terminal 104 may be a common conductive plate. The inner positive terminal 105 is connected to the substrate 107 via a distribution cable 109. The outer positive terminal 103 is connected to the substrate 107 via a distribution cable 110.

Figure 3:
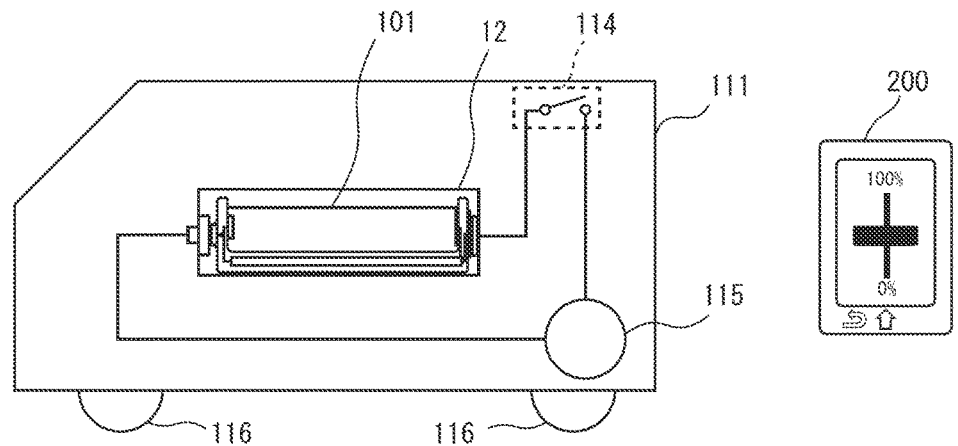
FIG. 3 is a diagram showing a mode of use of the cell type power supply device according to the first embodiment.

FIG. 3 is a diagram showing a mode of use of the cell type power supply device 100 of FIG. As shown in FIG. 3, an external load device 111 includes a load 115, a cell box 112, and a power switch (external switch) 114. Here, the external load device 111 is driven by one cell. The cell type power supply device 100 is attached alone in the cell box 112. The external load device 111 is an electronic equipment such as an electric toy, an electric tools toy, a disaster prevention sensor, a security sensor, a flashlight, a bicycle light, a cell-powered cooker, an electrical float, an electric pet feeding device, a cell-powered fan, or a cell-powered hand soap dispenser. Here, the external load device 111 is described as an electric toy driven by a motor 115. The electric toy is, for example, a miniature train or miniature car that moves at a fixed speed when being switched on. A wheel 116 is connected to the motor 115 via a transmission mechanism. When the power switch 114 is turned on, an electrical connection between the motor 115 and the cell box 112 is secured. When the power switch 114 is turned off, the motor 115 is electrically cut from the cell box 112.

An external information device 200 is typically a mobile digital electronic equipment, such as a smartphone, a portable telephone, a tablet terminal, or a radio control communication device, which has a communication function and an operation function etc. of course, the external information device 200 may be a dedicated device for operating the cell type power supply device 100. A user can turn on/off the motor 115 by operating the external information device 200. In addition, a user can designate any value between 0% (no drive signal output) and 100% (maximum drive signal output) as a motor output instruction value by operating the external information device 200. The cell type power supply device 100 is wirelessly connected to the external information device 200. A motor output instruction selected by a user is wirelessly transmitted from the external information device 200 to the cell type power supply device 100. As will be described later, an output transistor 120 is interposed between the outer negative terminal 104 and the inner negative terminal 106 or between the outer positive terminal 103 and the inner positive terminal 105 of the cell holder 102 of the cell type power supply device 100. The cell type power supply device 100 adjusts a power output by turning on/off the output transistor 120 in accordance with the motor output instruction from the external information device 200.

First Embodiment

Figure 4:
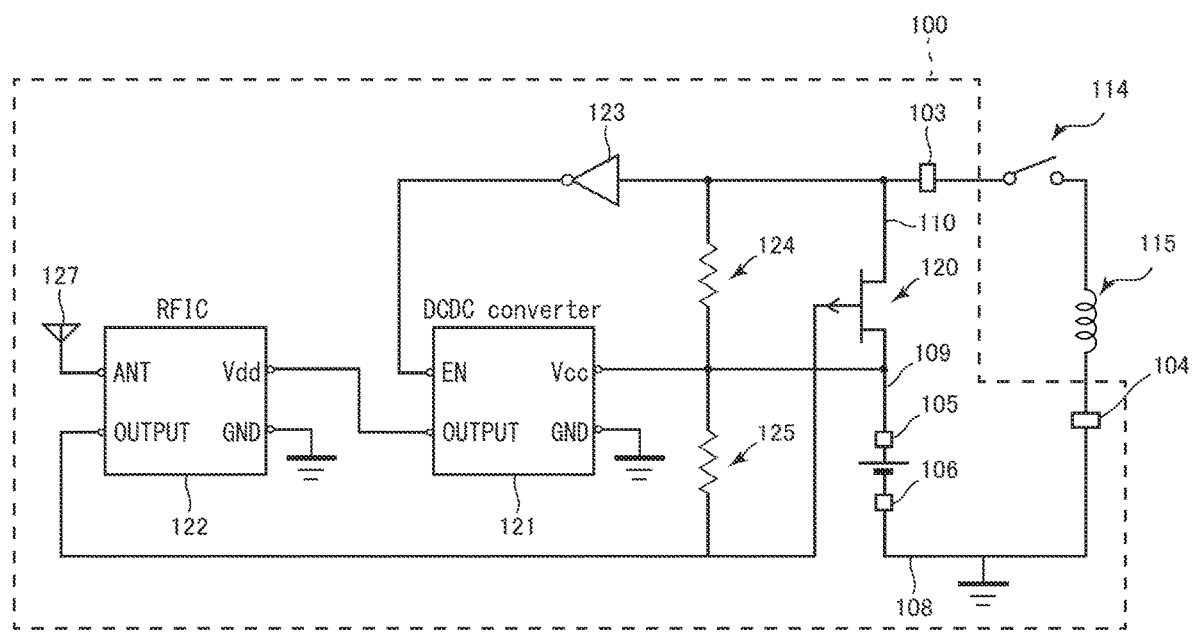
FIG. 4 is an equivalent circuit diagram showing an example of the cell type power supply device according to the first embodiment.

The cell type power supply device 100 according to the first embodiment is turned on/off in accordance with ON/OFF of the power switch 114. specifically, the wireless communication function of the cell type power supply device 100 is turned on/off in accordance with ON/OFF of the power switch 114. FIG. 4 is an equivalent circuit diagram showing an example of the cell type power supply device 100 according to the first embodiment. Here, the cell type power supply device 100 is attached alone in the cell box 112. An external cell is attached in the cell holder 102 of the cell type power supply device 100.
(Circuit Configuration)

The cell type power supply device 100 according to the first embodiment includes an output transistor 120, a DC-DC converter (internal power supply circuit) 121, an RF IC (control circuit) 122, an inverter 123, pull-up resister (detection resister) 124, and pull up resistor 125. Those electronic components are mounted on the substrate 107.

The output transistor 120 is typically a P-channel MOSFET, and is interposed between the inner positive terminal 105 and the outer positive terminal 103. The source terminal of the output transistor 120 is connected to the inner positive terminal 105 via distribution cable 109. The drain terminal of the output transistor 120 is connected to the outer positive terminal 103 via distribution cable 110.

Pull-up resister (detection resister) 124 is arranged between the inner positive terminal 105 and the outer positive terminal 103 in parallel with the output transistor 120. Pull-up resister 125 is interposed between the gate terminal of the output transistor 120 and the inner positive terminal 105.

The Vcc terminal of the DC-DC converter 121 is connected to the inner positive terminal 105, the EN terminal thereof is connected to the outer positive terminal 103, and the OUTPUT terminal thereof is connected to the Vdd terminal of the RF IC 122. The DC-DC converter 121 is an internal power supply circuit, and raises the cell voltage Vcc of the AAA cell attached in the cell holder 102 to the power supply voltage Vdd of, for example, 3.0V for internal circuit operation. The DC-DC converter 121 is configured to supply the power supply voltage Vdd to the RF IC 122 when its EN terminal is at the high level, and not to supply the power supply voltage Vdd to the RF IC 122 when its EN terminal is at the low level. Here, the DC-DC converter 121 functions as internal power supply circuit for supplying a drive voltage of the RF IC 122; however, the internal power supply circuit for supplying a drive voltage to the RF IC 122 may be an electronic component etc. other than the DC-DC converter 121.

The inverter 123 is interposed between the drain terminal of the output transistor 120 and the EN terminal of the DC-DC converter 121. Arranging the inverter 123 in the input stage of the DC-DC converter 121 can avoid a breakdown etc. of the DC-DC converter caused by an inverse voltage generated in the motor 115. The input terminal of the inverter 123 is connected to the drain terminal of the output transistor 120, and the output terminal thereof is connected to the EN terminal of the DC-DC converter 121. The inverter 123 inverts input signals and then outputs the inverted signals.

The RF IC 122 is a control circuit that is driven by a power supply voltage Vdd and performs centralized control of the cell type power supply device 100. An antenna 127 for wireless communication is connected to the ANT terminal of the RF IC 122. The OUTPUT terminal of the RF IC 122 is connected to the gate terminal of the output transistor 120. The RF IC 122 functionally includes a communication unit, a control signal generation unit, and a control unit, etc. The communication unit is driven in accordance with control of the control unit, and performs a wireless communication based on the Bluetooth (registered trademark) standard with the external information device 200 via the antenna 127. The RF IC 122 may perform a wireless communication based on another wireless communication standard, such as a wireless LAN standard. The communication unit receives a code wireless signal that indicates ON/OFF of the motor 115 from the external information device 200 via the antenna 127. When a code wireless signal indicating ON of the motor 115 is received, the control signal generation unit is driven in accordance with control of the control unit, and generates a low-level gate control signal. When a code wireless signal indicating OFF of the motor 115 is received, the control signal generation unit generates a high-level gate control signal in accordance with control of the control unit. Alternatively, the control signal generation unit is turned off in accordance with control of the control unit, thereby releasing the OUTPUT terminal. The "high-level" of the gate control signal generated by the control signal generation unit refers to a voltage value sufficiently lower than the threshold voltage Vth of the output transistor 120, and the "low-level"

refers to a voltage value sufficiently higher than the threshold voltage Vth of the output transistor 120.

The ON/OFF of the output transistor 120 is controlled by the voltage (gate voltage) applied by the gate control signal input to the gate. When the gate voltage is at a low level sufficiently lower than the threshold voltage Vth, a channel is formed between the source and drain, and the maximum drain current flows. In this state, the output transistor 120 is ON. When the output transistor 120 is turned on, a current flows between the outer positive terminal 103 and outer negative terminal 104 of the cell type power supply device 100 via the built-in buttery. When the power switch 114 of the external load device 111 is ON, a current flows between the outer positive terminal 103 and the outer negative terminal 104 of the cell type power supply device 100, and the motor 115 of the external load device 111 is driven. In contrast, when the gate voltage is at a high level sufficiently higher than the threshold voltage Vth, a drain current does not flow between the source and drain. In this state, the output transistor 120 is OFF. When the output transistor 120 is turned off, the outer positive terminal 103 and the outer negative terminal 104 of the cell type power supply device 100 are cut from each other. Accordingly, even when the power switch 114 of the external load device 111 is ON, the circuit of the external load device 111 is cut off, and the motor 115 is not driven.

(Operation Description)

Hereinafter, the state in which the power switch 114 is OFF is called an OFF state of the external load device 111, the state in which the power switch 114 is ON, but the motor 115 is not operating is called a standby state of the external load device 111, and the state in which the motor 115 is operating is called an operating state of the external load device 111. In addition, the state in which the control unit of the RF IC 122 is not driven is called an OFF state of the cell type power supply device 100, the state in which the transmitting/receiving operation by the wireless communication unit is OFF is called a standby state of the cell type power supply device 100, the state in which the transmitting/receiving operation by the wireless communication unit is ON is called a communication possible state of the cell type power supply device 100, and the state in which a gate control signal is output by the RF IC 122 is called an operating state of the cell type power supply device 100.

A feature of the cell type power supply device 100 according to the first embodiment lies in arranging pull-up resister (detection resister) 124 between the inner positive terminal 105 and the outer positive terminal 103 in parallel with the output transistor 120 so that the voltage level of the outer positive terminal 103 changes with respect to the reference potential in accordance with ON/OFF of the power switch 114. Here, let us assume the reference potential is the GND potential. When the power switch 114 is OFF, the outer positive terminal 103 is connected to the inner positive terminal 105 via pull-up resister 124, and thus is at the high level. In contrast, when the power switch 114 is switched from OFF to ON, the outer positive terminal 103 is connected to the GND via the power switch 114, and thus is switched from the high level to the low level. In this way, the voltage level of the outer positive terminal 103 changes in accordance with ON/OFF of the power switch 114. The cell type power supply device 100 detects ON/OFF of the power switch 114 by detecting a change in the voltage level of the outer positive terminal 103.

When the external load device 111 is in the initial state, the input terminal of the inverter 123 is connected to the inner positive terminal 105 via pull-up resister 124, and thus is at the high level, and the EN terminal of the DC-DC converter 121 (output terminal of the inverter 123) is at the low level. Accordingly, the power supply voltage Vdd generated by the DC-DC converter 121 is not supplied to the RF IC 122. Therefore, the cell type power supply device 100 is in the OFF state.

When the power switch 114 is turned on, the input terminal of the inverter 123 is connected to the GND via the power switch 114, and thus is switched from the high level to the low level, and the EN terminal of the DC-DC converter 121 is switched from the low level to the high level. Accordingly, the power supply voltage Vdd generated by the DC-DC converter 121 is supplied to the RF IC 122, thereby driving the control unit of the RF IC 122, whereby the state of the cell type power supply device 100 transitions from the OFF state to the standby state. In response to the driving of the RF IC 122, the transmitting/receiving operation by the wireless communication unit is switched from OFF to ON in accordance with control of the control unit, whereby the cell type power supply device 100 transitions from the standby state to the communication possible state.

When the power switch 114 is turned off, the input terminal of the inverter 123 is again connected to the inner positive terminal 105 via pull-up resister 124, and thus is switched from the low level to the high level, thereby turning off the RF IC 122 and switching the state of the cell type power supply device 100 from the communication possible state to the OFF state.

When the cell type power supply device 100 is in the communication possible state, the cell type power supply device 100 can perform various processes in accordance with wireless signals received from the external information device 200. For example, when a code wireless signal indicating ON of the motor 115 is received from the external information device 200 via the wireless communication unit, the control signal generation unit generates a low-level gate control signal. The gate terminal of the output transistor 120 is thereby brought into the low level; therefore, the output transistor 120 is turned on, and the motor 115 is driven. In this way, a user can turn on the external load device 111 at any time by operating the external information device 200.

As described in relation to FIG. 4, the cell type power supply device 100 according to the first embodiment can switch the state of the cell type power supply device 100 from the OFF state to the communication possible state in response to turning on of the power switch 114 of the external load device 111, and from the communication possible state to the OFF state in response to turning off of the power switch 114. Therefore, the cell type power supply device 100 does not need to have a switch for switching between the OFF state and the communication possible state, which contributes to miniaturization and parts cost reduction of the device. In addition, when the external load device 111 is in the initial state, the DC-DC converter 121 and RF IC 122 are not driven, which can reduce unnecessary power consumption.

The cell type power supply device 100 according to the first embodiment has a configuration in which the output signal of the inverter 123 is input to the DC-DC converter 121; however, it may have a configuration in which the output signal of the inverter 123 is input to the RF IC 122.

Figure 5:
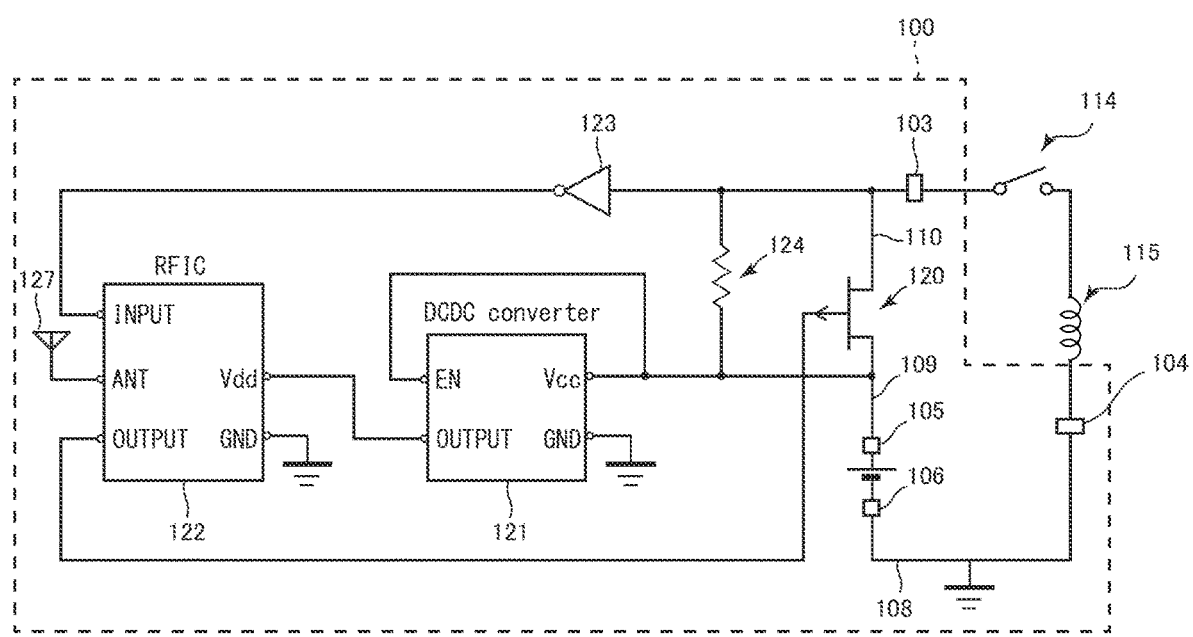
FIG. 5 is an equivalent circuit diagram showing another example of the cell type power supply device according to the first embodiment.

FIG. 5 is an equivalent circuit diagram showing another example of the cell type power supply device 100 according to the first embodiment. The output terminal of the inverter 123 is connected to the INPUT terminal of the RE IC 122. Arranging the inverter 123 in the input stage of the RE IC 122 can avoid a breakdown etc. of the RE IC 122 caused by an inverse voltage generated in the motor 115. The EN terminal of the DC-DC converter 121 is connected to the inner positive terminal 105. Therefore, while the external cell is attached in the cell holder 102, the DC-DC converter 121 is ON, and the cell type power supply device 100 is in the standby state.

The RF IC 122 switches between ON and OFF of the RF signal transmitting/receiving operation via the antenna 127 in accordance with ON/OFF of the power switch 114 which is determined based on the voltage level of the outer positive terminal 103. As described in relation to FIG. 4, the ON/OFF of the power switch 114 can be determined based on the voltage level of the output signal of the inverter 123. When the power switch 114 is ON, the output signal of the inverter 123 is at the high level, and when the power switch 114 is OFF, the output signal of the inverter 123 is at the low level. Accordingly, when the INPUT terminal is at the low level, the power switch 114 is determined as being OFF; therefore, the transmitting/receiving operation by the wireless communication unit is turned off in accordance with control of the control unit, and the state of the cell type power supply device 100 is switched from the communication possible state to the standby state. When the INPUT terminal is at the high level, the power switch 114 is determined as being ON; therefore, the transmitting/receiving operation by the wireless communication unit is turned on in accordance with control of the control unit, and the state of the cell type power supply device 100 is switched from the standby state to the communication possible state. The switching between ON and OFF of the transmitting/receiving operation of the wireless communication unit by the control unit is performed by controlling the supply of the drive voltage Vdd to a communication module of the wireless communication unit. Of course, the switching between ON and OFF of the transmitting/receiving operation of the wireless communication unit by the control unit may be performed by controlling output of a radio wave by software in a state where the communication module is driven.

As described in relation to FIG. 5, according to another example of the cell type power supply device 100 according to the first embodiment, the state of the cell type power supply device 100 can be switched from the standby state to the communication possible state in response to turning on of the power switch 114 of the external load device 111, and can be switched from the communication possible state to the standby state in response to turning off of the power switch 114. Therefore, the cell type power supply device 100 does not need to have a switch for switching between the standby state and the communication possible state, which contributes to miniaturization and parts cost reduction of the device. In addition, when the external load device 111 is in the initial state, the DC-DC converter 121 and RF IC 122 are not driven, which can reduce unnecessary power consumption.

Figure 6:
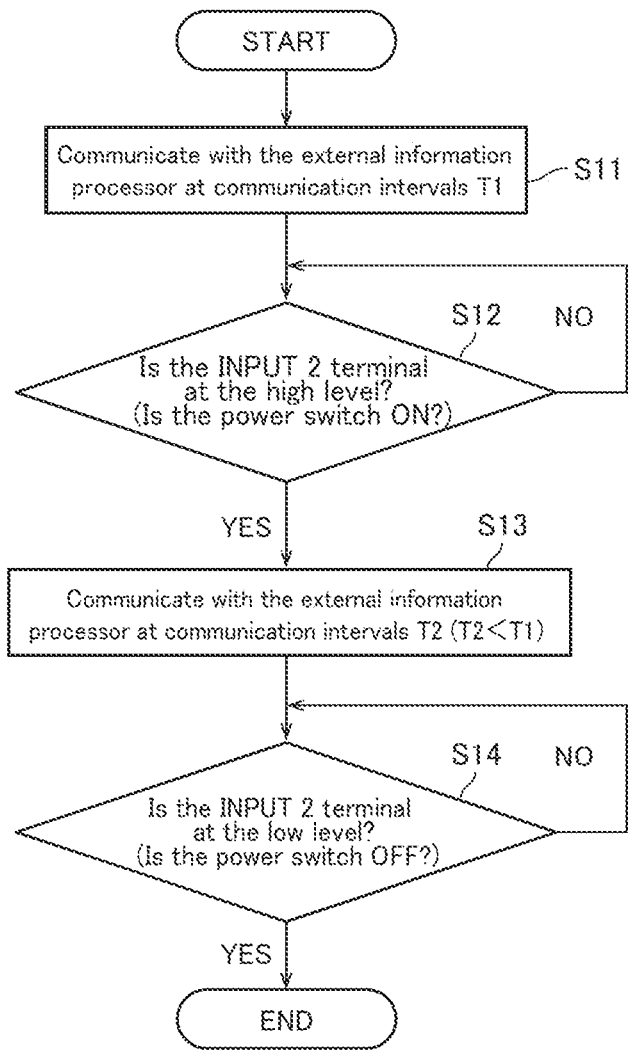
FIG. 6 is a flowchart showing a procedure of a process for changing a communication interval by the cell type power supply device of FIG. 5.

Furthermore, with the circuit configuration as shown in FIG. 5, the cell type power supply device 100 is in the standby state while the external cell is attached in the cell holder 102. The control unit may perform, in accordance with ON/OFF of the power switch 114, a process other than turning on/off of the transmitting/receiving operation by the wireless communication unit. For example, the control unit changes the communication interval between communications with the external information device 200 in accordance with ON/OFF of the power switch 114. FIG. 6 is a flowchart showing a procedure of a process for changing a communication interval by the cell type power supply device of FIG. 5. When the external load device 111 is in the initial state, the cell type power supply device 100 is in the standby state. The wireless communication unit communicates with the external information device 200 at communication intervals T1 in accordance with control of the control unit (step S11). When the power switch 114 is turned on (step S12), i.e., when the INPUT terminal of the RF IC 122 is switched from the low level to the high level, the wireless communication unit communicates with the external information device 200 at communication intervals T2 shorter than communication intervals T1 in accordance with control of the control unit (step S13). Communication intervals T1 and T2 may be preset, or may be values set by a user via the external information device 200. When the power switch 114 is turned off (step S14), i.e., the INPUT terminal of the RF IC 122 is switched from the high level to the low level, the processing returns to step S11, and the wireless communication unit communicates with the external information device 200 at communication intervals T1 in accordance with control of the control unit.

When the external load device 111 is in the standby state, shortening the interval between communications with the external information device 200 can improve the response speed of the cell type power supply device 100 to an instruction from the external information device 200, and can improve connectivity of the communication with the external information device 200. In addition, when the external load device 111 is in the OFF state (power switch 114 is OFF), prolonging the interval between communications with the external information device 200 can reduce unnecessary power consumption.

Second Embodiment

The cell type power supply device 100 according to the second embodiment can use a PWM signal as the gate control signal of the output transistor 120 of the cell type power supply device 100 according to the first embodiment.
(Circuit Configuration)

Figure 7:
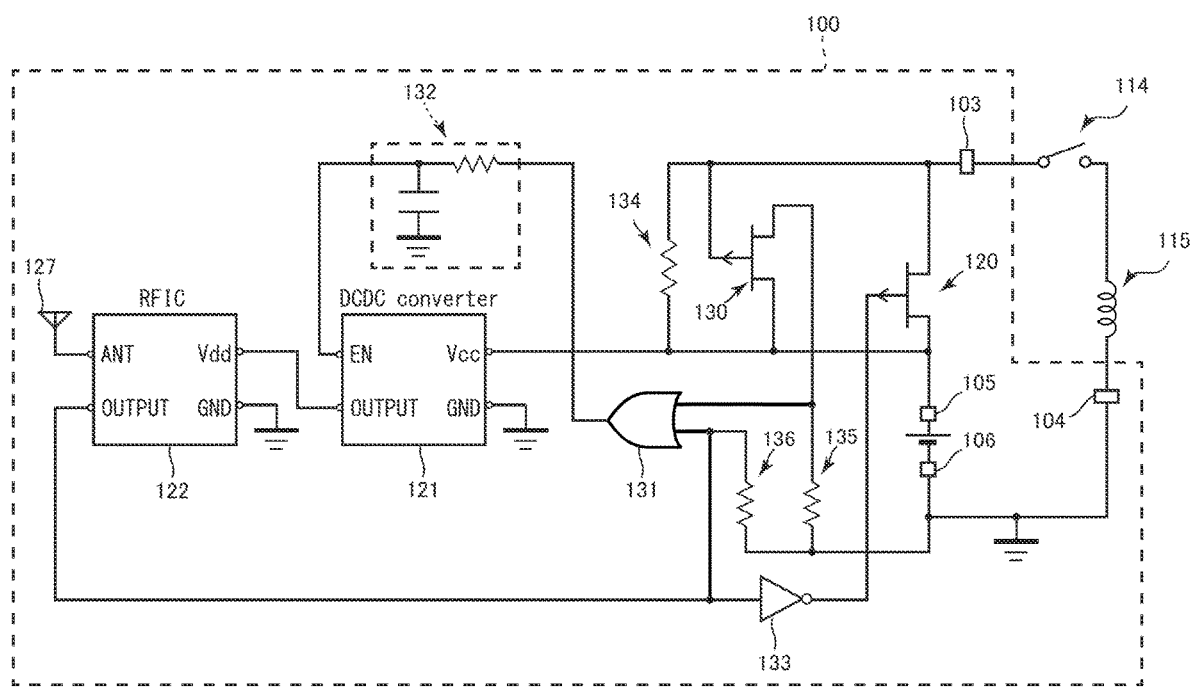
FIG. 7 is an equivalent circuit diagram showing an example of A cell type power supply device according to a second embodiment.
Figure 8:
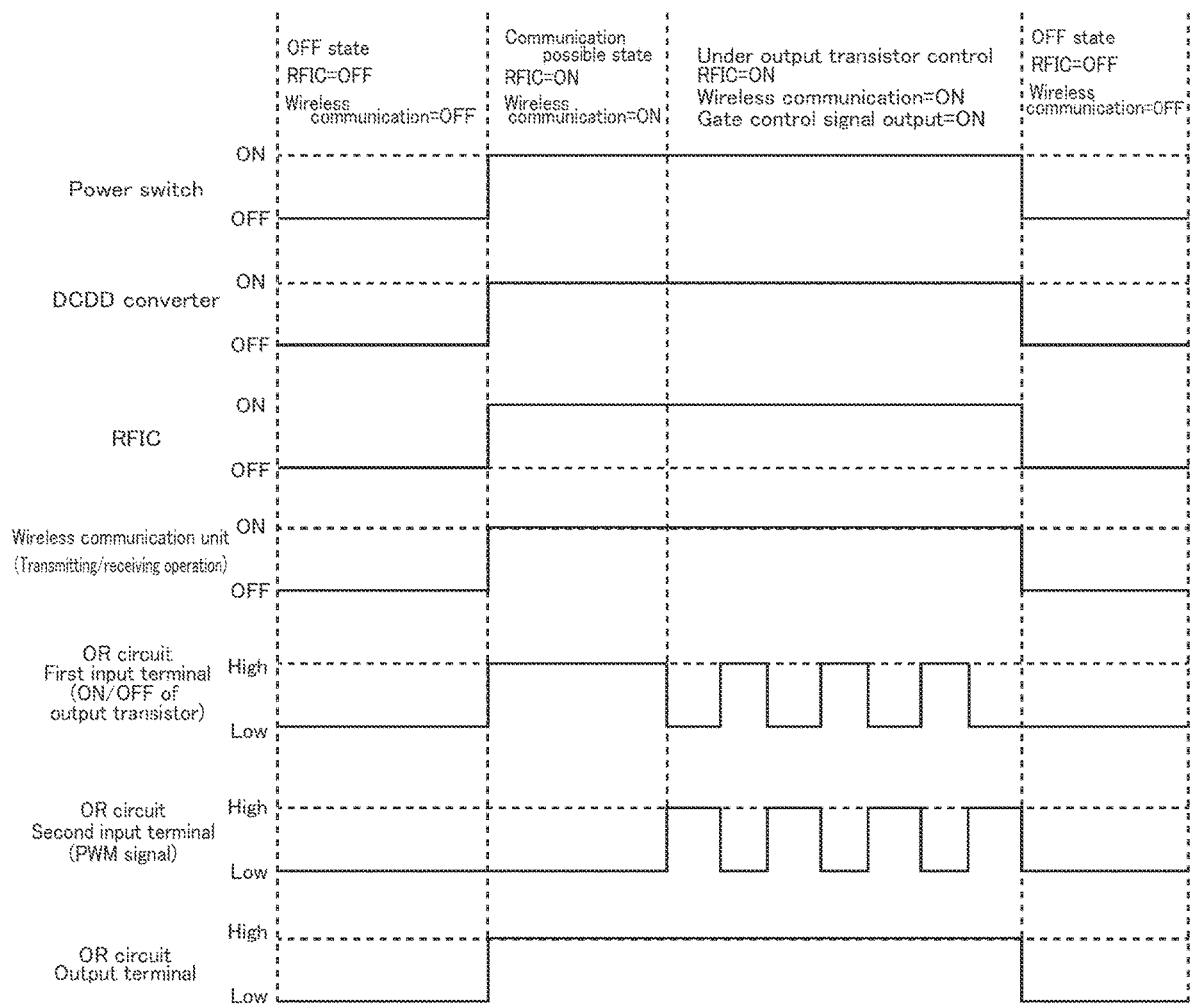
FIG. 8 is a timing chart showing changes of the input signal of an EN terminal of a DC-DC converter with respect to output of the RFIC of FIG. 7.

FIG. 7 is an equivalent circuit diagram showing an example of the cell type power supply device 100 according to the second embodiment. One feature of the cell type power supply device 100 according to the second embodiment lies in arranging an OR circuit 131 in the preceding stage of the EN terminal of the DC-DC converter 121.

The OR circuit 131 has two input terminals and one output terminal. When at least one of the two input terminals is at the high level, the OR circuit 131 outputs a high-level signal. When both of the two output terminals are at the low level, the OR circuit 131 outputs a low-level signal. The output terminal of the OR terminal 131 is connected to the EN terminal of the DC-DC converter 121. A low-pass filter 132 is interposed between the output terminal of the OR circuit 131 and the EN terminal of the DC-DC converter 121. The low-pass filter 132 includes, for example, a resister and a capacitor. The low-pass filter 132 allows components of frequencies lower then a cutoff frequency, downconverts components of frequencies higher than the cutoff frequency, and controls instantaneous signal fluctuations caused by noise etc.

One input terminal (first input terminal) of the OR circuit 131 is connected to the OUTPUT terminal of the RF IC 122. The other input terminal (second input terminal) of the OR circuit 131 is connected to the inner positive terminal 105 via a detection transistor 130. The first and second input terminals of the OR circuit 131 are connected to the GND via pull-down resisters 136 and 135.

An inverter 133 is interposed between the OUTPUT terminal of the RF IC 122 and the gate terminal of the output transistor 120. The output of the inverter 133 is input to the gate of the output transistor 120.

The detection: transistor 130 is typically a P-channel MOSFET and detects ON/OFF of the power switch 114. The drain terminal of the detection transistor 130 is connected to the second input terminal of the OR circuit 131, the source terminal thereof is connected to the inner positive terminal 105, and the gate terminal thereof is connected to the outer positive terminal 103. As in the first embodiment, the pull-up resister (detection resister) 134 is provided between the inner positive terminal 105 and the outer positive terminal 103 in parallel with the output transistor 120. Therefore, the signal level of the outer positive terminal 103 can be switched between the low level and the high level in accordance with ON/OFF of the power switch 114. By connecting the gate terminal of the detection transistor 130 to the outer positive terminal 103, the detection transistor 130 can be turned on/off in accordance with ON/OFF of the power switch 114.

The control signal generation unit generates a gate control signal corresponding to a received motor output instruction value in accordance with control of the control unit. Here, a PWM (pulse width signal modulation) signal is provided as the gate control signal. For example, when the motor output instruction value is 0%, the control signal generation unit generates a 0% duty cycle (only low level) PWM signal. When the motor output instruction value is 100%, the control signal generation unit generates a 100% duty cycle (only high level) PWM signal. When the motor output instruction value is 50%, the control signal generation unit generates a 50% duty cycle (1-to-1 low level-to-high level ratio) PWM signal. The PWM signal generated by the control signal generation unit is input to the input transistor 120 as a gate control signal.

When the PWM signal is at the high level (the gate terminal is at the low level), the output transistor 120 is ON. Therefore, the circuit of the external load device 111 is brought into conduction, and the motor 115 is driven. When the PWM signal (gate control signal) is at the low level (the gate terminal is at the high level), the output transistor 120 is OFF. Therefore, the circuit of the external load device 111 is cut off, and the motor 115 is not driven. While the PWM signal is input to the gate terminal, the motor 115 repeats starting rotation and stopping rotation in a predetermined cycle. When the output transistor 120 is switched from ON to OFF, the motor 115 gradually slows down its rotation because of its coil characteristics. In contrast, when the output transistor 120 is switched from OFF to ON, the rotation speeds up again. By using those characteristics, the motor 115 can be rotated at given revs by PWM control.

(Operation Description)

One feature of the cell type power supply device 100 according to the second embodiment lies in arranging the CR circuit 131 in the preceding stage of the DC-DC converter 121. The CR circuit 131 receives a gate control signal output from the RF IC 122 and a detection signal of the detection transistor 130 as inputs, and outputs a high-level or low-level signal to the DC-DC converter 121 as an OR operation result. Accordingly, when the power switch 114 is ON, the cell type power supply device 100 can be prevented from switching from the communication possible state to the OFF state or the standby state.

Specifically, when the external load device 111 is in the initial state, the detection transistor 130 and the RF IC 122 are both OFF; therefore, the first and second input terminals of the OR circuit 131 are connected to the GND via the pull-down resisters 136 and 135, respectively, and thus are at the low level. Consequently, the power supply voltage Vdd generated by the DC-DC converter 121 is not supplied to the RF IC 122. Hence, the cell type power supply device 100 is in the OFF state.

When the power switch 114 is turned on, the gate terminal of the detection transistor 130 is connected to the GND via the power switch 114, and thus is switched from the high level to the low level. The second input terminal of the OR circuit 131 is connected to the inner positive terminal 105 via the detection transistor 130, and is switched from the low level to the high level, whereby the OR circuit 131 outputs a high-level signal. The EN terminal of the DC-DC converter 121 is switched from the low level to the high level, and the power supply voltage Vdd generated by the DC-DC converter 121 is supplied to the RF IC 122, whereby the control unit of the RF IC 122 is driven, and the state of the cell type power supply device 100 is switched from the OFF state to the standby state. In response to the driving of the control unit of the RF IC 122, the transmitting/receiving operation by the wireless communication unit is switched from OFF to ON in accordance with control of the control unit, and the state of the cell type power supply device 100 is switched from the standby state to the communication possible state. The power output of the output transistor 120 is adjusted in accordance with a PWM signal corresponding to the motor output instruction from the external information device 200.

When the output transistor 120 is turned off (when the gate terminal of the output transistor 120 is at the high level) in the state where the power switch 114 is ON, the gate terminal of the detection transistor 130 is connected to the GND via the power switch 114, and thus is at the low level, whereby the detection transistor 130 turned on. By turning on the detection transistor 130, the second input terminal of the OR circuit 131 is connected to the inner positive terminal 105 via the detection transistor 130 and thus is at the high level, whereby the OR circuit 131 outputs high-level signal to the DC-DC converter 121.

When the output transistor 120 is turned on (when the gate terminal of the output transistor 120 is at the low level) in the state where the power switch 114 is ON, the gate terminal of the detection transistor 130 is connected to the inner positive terminal 105 via the output transistor 120, and thus is at the high level, whereby the detection transistor 130 is turned off. The first input terminal of the OR circuit 131 is connected to the GND via pull-down resister 136, and thus is at the low level. In contrast, when the output transistor 120 is ON, the gate control signal output from the OUTPUT terminal is at the high level. Therefore, the first input terminal of the OR circuit 131 is connected to the OUTPUT terminal and thus is at the high level, whereby the OR circuit 131 outputs high-level signal to the DC-DC converter 121.

Accordingly, while the output transistor 120 is turned off by the gate control signal, the first input terminal of the OR circuit 131 is at the high level, and the second input terminal thereof is at the low level; therefore, the OR circuit 131 outputs a high-level signal. In contrast, while the output transistor 120 is ON, the first input terminal of the OR circuit 131 is at the low level, and the second input terminal thereof is at the high level; therefore the OR circuit 131 outputs a high-level signal.

In this way, as long as the power switch 114 is ON, even when the output transistor 120 is turned on/off by a gate control signal, the OR circuit 131 can maintain its ON state. Hence, even when a PWM signal is used as the gate control signal, the cell type power supply device 100 can be maintained in the communication possible state. Enabling use of the PWM signal makes it possible to provide a power supply device that can freely adjust the power output in the 0%-to-100% range. Accordingly, for example, only by attaching the cell type power supply device 100 according to the second embodiment in the cell box 112, the external load device 111 which does not originally have means for adjusting the power output can be provided with the means for adjusting the power output. A user can freely change the operation speed of, for example, the electric toy in which the cell type power supply device 100 is attached by operating the external information device 200.

In the second embodiment, the output signal of the OR circuit 131 is input to the DC-DC converter 121. Alternatively, the output signal of the OR circuit 131 may be input to the INPUT terminal of the RF IC 122, and the transmitting/receiving operation by the wireless communication unit may be switched on/off by the control unit in accordance with the signal level of the INPUT terminal.

Third Embodiment

In the first and second embodiments, described is a circuit example of the case where a P-channel MOFET is used as the output transistor 120; however, an N-channel MOSFET may be used as the output transistor 120. Some N-channel MOSFETs are cheaper than P-channel MOSFETs, and use of an N-channel MOSFET can reduce the parts cost of the cell type power supply device 100. In addition, some N-channel MOSFETs have a higher withstand voltage than P-channel MOSFETs, and use an N-channel MOSFET can increase the number of external cells that can be connected to the cell type power supply device 100 in series. It is expected that it expands the range of the external load device 111 for which the cell type power supply device 100 can be used. The output transistor 120 may be a bipolar transistor. In that case, a base control signal is substituted for a gate control signal.

(Circuit Configuration)

Figure 9:
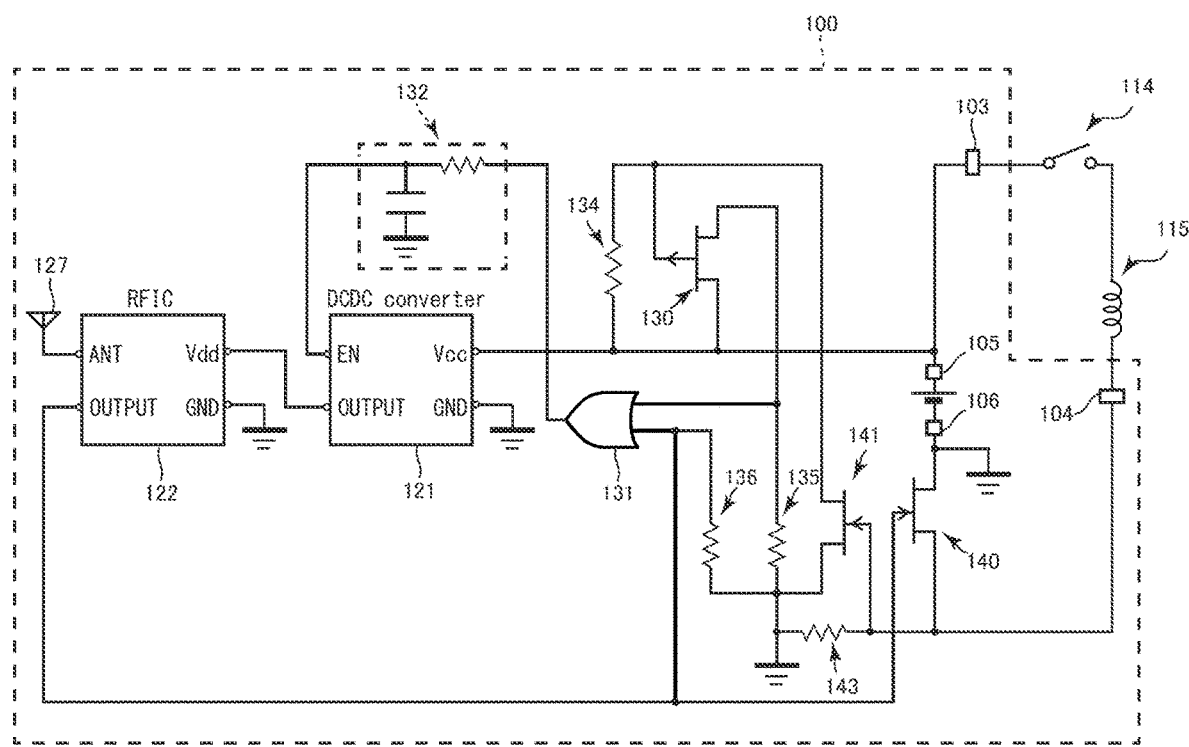
FIG. 9 is an equivalent circuit diagram showing an example of A cell type power supply device according to a third embodiment.

FIG. 9 is an equivalent circuit diagram showing an example of the cell type power supply device 100 according to the third embodiment. FIG. 9 shows a circuit example of the case where the output transistor 120 of the circuit of FIG. 7 is changed from a P-channel MOSFET to an N-channel MOSFET. As shown in FIG. 9, the wiring between the OR circuit 131, the DC-DC converter 121, and the RF IC 122 is the same as that of the circuit of FIG. The output transistor 140 is interposed between the inner negative terminal 106 and the outer negative terminal 104. The source terminal of the output transistor 140 is connected to the inner negative terminal 106, the drain terminal thereof is connected to the outer negative terminal 104, and the gate terminal thereof is connected to the OUTPUT terminal of the RF IC 122.

In the third embodiment, two detection transistors are used to detect ON/OFF of the power switch 114. The first detection transistor 130 is a P-channel MOSFET. The source terminal of the first detection transistor 130 is connected to the inner positive terminal 105, the gate terminal thereof is connected to the drain terminal of the second detection transistor 141, and the drain terminal thereof is connected to the second input terminal of the OR circuit 131. When the first detection transistor 130 is OFF, the second input terminal of the OR circuit 131 is connected to the GND via pull-down resister 135 to stabilize the second input terminal of the OR circuit 131 at the low level. When the second detection transistor 141 is OFF, the gate terminal of the second transistor 130 is connected to the inner positive terminal 105 via pull-up resister 134 to stabilize the gate terminal of the first detection transistor 130 at the high level. The second detection transistor 141 is an N-channel MOSFET. The source terminal of the second detection transistor 141 is connected to the GND, the gate terminal thereof is connected to the outer negative terminal 104, and the drain terminal thereof is connected to the gate terminal of the first detection transistor 130. When the power switch 114 is OFF, the gate terminal of the second detection transistor 141 is connected to the GND via pull-down resister 143 to stabilize the gate terminal of the second detection transistor 141 at the low level.

(Operation Description)

When the external load device 111 is in the initial state (the power switch 114 is OFF), the second detection transistor 141 is OFF because its gate terminal is connected to the GND via pull-down resister 143 and thus is at the low level. The first detection transistor 130 is OFF because its gate terminal is connected to the inner positive terminal 105 via pull-up resister 134 and thus is at the high level. Since the external load device 111 is in the initial state, and the RF IC 122 is not driven, a gate control signal is not output. Therefore, the OR circuit 131 outputs a low-level signal because its first and second input terminals are connected to the GND via pull-down resisters 136 and 135, respectively, and thus are at the low level.

When the power switch 114 is turned on, the second detection transistor 141 is turned on because its gate terminal is connected to the inner positive terminal 105 via the outer negative terminal 104, the motor 115, the power switch 114, and the outer positive terminal 103, and thus is at the high level. The first detection transistor 130 is turned on because its gate terminal is connected to the GND via the second detection transistor 141, and thus is at the low level. The second input terminal of the OR circuit 131 is connected to the inner positive terminal 105 via the first detection transistor 130, and is switched from the low level to the high level, whereby the OR circuit 131 outputs a high-level signal. The EN terminal of the DC-DC converter 121 is switched from the low level to the high level, and the power supply voltage Vdd generated by the DC-DC converter 121 is supplied to the RF IC 122, thereby driving the control unit of the RF IC 122, and switching the state of the cell type power supply device 100 from the OFF state to the standby state. In response to the driving of the control unit of the RF IC 122, the transmitting/receiving operation by the wireless communication unit is switched from OFF to ON in accordance with control of the control unit, and the state of the cell type power supply device 100 is switched from the standby state to the communication possible state. The power output of the output transistor 140 is adjusted in accordance with the PPM signal corresponding to the motor output instruction from the external information device 200.

The cell type power supply device 100 according to the third embodiment as described above can switch its state between the OFF state and the communication possible state in accordance with ON/OFF of the power switch 114. In addition, as long as the power switch 114 is ON, even when the output transistor 140 is turned on/off by a gate control signal, the OR circuit 131 can be maintained in the ON state. Accordingly, even when a PPM signal is used as the gate control signal, the state of the cell type power supply device 100 can be maintained in the communication possible state. Namely, even when an N-channel MOSFET is used as the output transistor 140, the cell type power supply device 100 can be operated in the same manner and produces the same effect as the cell type power supply device 100 according to the second embodiment, which uses a P-channel MOSFET as the output transistor 120.

Fourth Embodiment

In the cell type power supply device 100 according to the second embodiment, the OR circuit 131 is arranged in the preceding stage of the EN terminal of the DC-DC converter 121, and the PPM signal output from the RF IC 122 is ORed with the detection signal output from the detection transistor 130 at the OR circuit 131; therefore, even when a PPM signal is used as the gate control signal of the output transistor 120, as long as the power switch 114 is ON, the cell type power supply device 100 can be maintained in the communication possible state. In the cell type power supply device 100 according to the fourth embodiment, the processing performed at the OR circuit 131 of the second embodiment is performed in the RF IC 122.

(Circuit Configuration)

Figure 10:
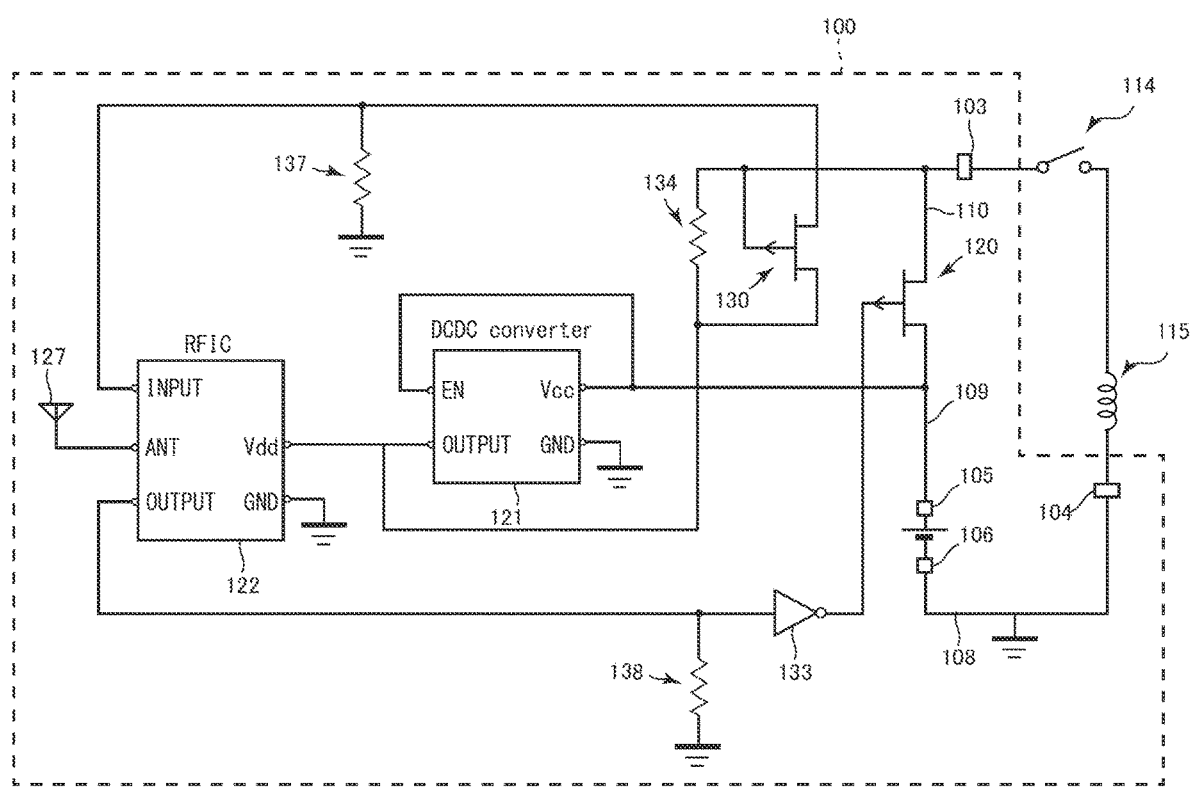
FIG. 10 is an equivalent circuit diagram showing an example of A cell type power supply device according to a fourth embodiment.

FIG. 10 is a circuit example of the case where the inverter 123 of the circuit of FIG. 5 of the first embodiment is replaced with a P-channel MOSFET. The gate terminal of the detection transistor 130 is connected to the outer positive terminal 103, the source terminal thereof is connected to the OUTPUT terminal of the DC-DC converter 121, and the drain terminal thereof is connected to the INPUT terminal of the RF IC 122. When the power switch 114 is OFF, the gate terminal of the detection transistor 130 is connected to the INPUT terminal of the DC-DC converter 121 via pull-up resister 134 to stabilize the gate terminal of the detection transistor 130 at the high level. When the detection transistor 130 is OFF, the INPUT terminal of the RF IC 122 is connected to the GND via pull-down resister 137 to stabilize the INPUT terminal of the RF IC 122 at the low level. The OUTPUT terminal of the RF IC 122 is connected to the gate terminal of the output transistor 120. An inverter 133 is interposed between the OUTPUT terminal of the RF IC 122 and the gate terminal of the output transistor 120. The input terminal of the inverter 133 is connected to the OUTPUT terminal of the RF IC 122, and the output terminal thereof is connected to the gate terminal of the output transistor 120. When the OUTPUT terminal of the RF IC 122 is open, the input terminal of the inverter 133 is connected to the GND via pull-down resister 138 to stabilize the gate terminal of the output transistor 120 at the high level.

(Operation Description)

Figure 11:
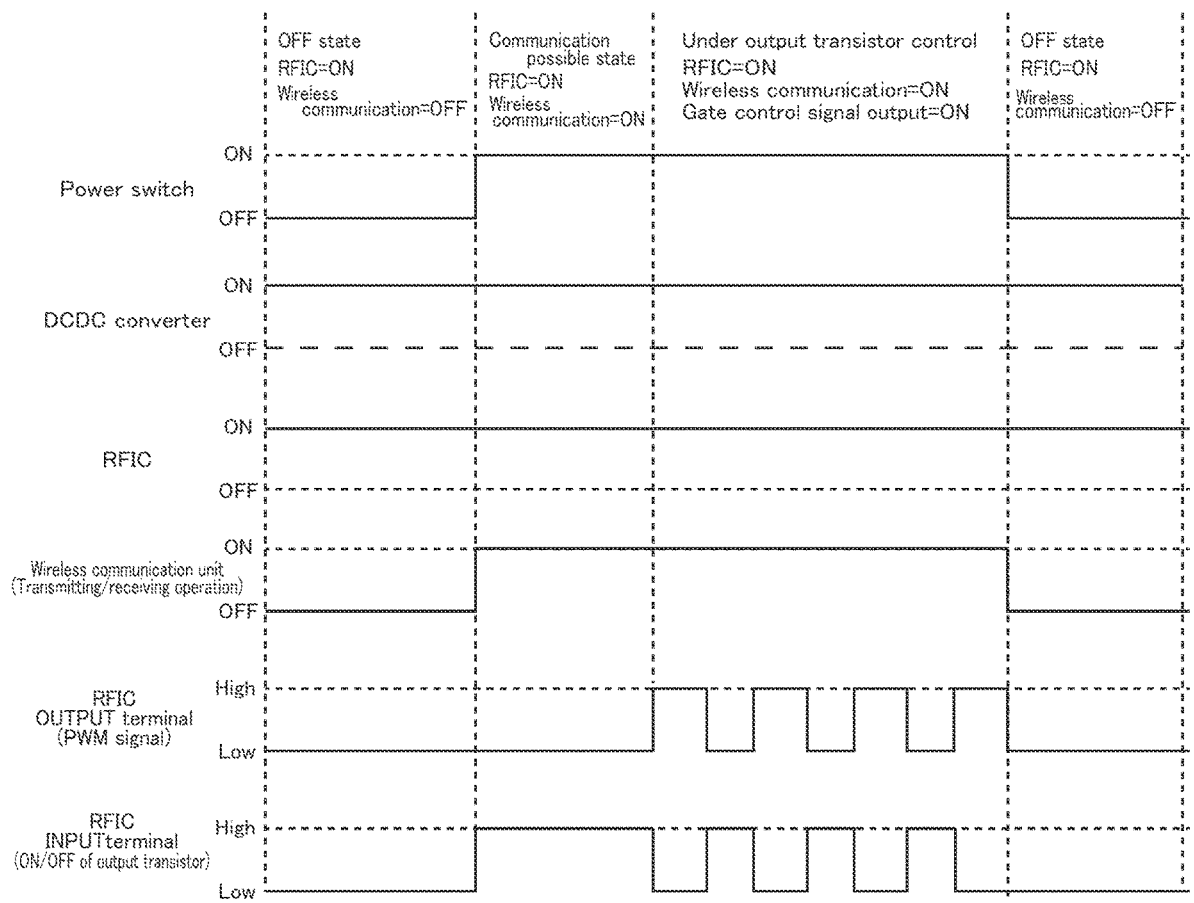
FIG. 11 is a timing chart showing changes of the input/output of each terminal under PWM control by the RF IC of FIG. 10.
Figure 12:
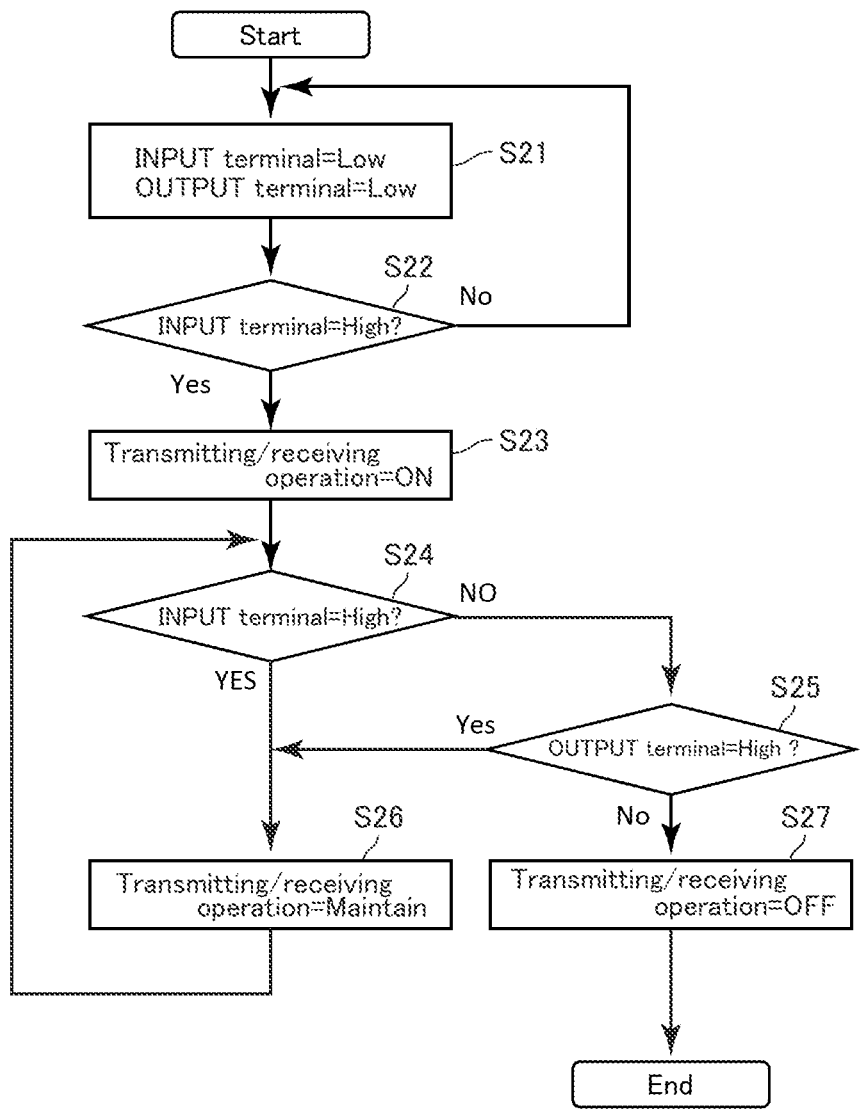
FIG. 12 is a flowchart showing a procedure of a process for switching on/off the transmitting/receiving operation by a control unit of the RF IC of FIG. 10.

FIG. 11 is a timing chart showing changes of the input/output of each terminal under PNM control by the RF IC 122 of FIG. 10 FIG. 12 is a flowchart showing a procedure of a process for switching on/off of the transmitting/receiving operation by the RF IC 122 of FIG. 10. The control unit controls ON/OFF of the transmitting/receiving operation by the wireless communication unit in accordance with the OR of the gate control signal generated by the control signal generation unit and output from the OUTPUT terminal and the signal input to the INPUT terminal. Specifically, the control unit turns on the transmitting/receiving operation when the OR of the gate control signal output from the OUTPUT terminal and the signal input to the INPUT terminal is the high level, and turns off the transmitting/receiving operation when the OR is the low level.

As shown in FIG. 12, when the external load device 111 is in the initial state (the power switch 114 is in the OFF state), the INPUT terminal of the RF IC 122 is at the low level, and the OUTPUT terminal thereof is at the low level (step S21). Hence, the OR of the signal levels of those two terminals is the low level; therefore, the transmitting/receiving operation by the wireless communication unit is not ON. Accordingly, the cell type power supply device 100 is in the standby state in which the transmitting/receiving operation is OFF. When the INPUT terminal is switched from the low level to the high level, i.e., when the power switch 114 is turned on (step S22), the OR of the signal levels of those two terminals is switched from the low level to the high level. The transmitting/receiving operation by the wireless communication unit is thereby turned on in accordance with control of the control unit, and the state of the cell type power supply device 100 is switched from the standby state to the communication possible state (step S23).

When the INPUT terminal is at the high level (Yes in step 324), the transmitting/receiving operation by the wireless communication unit is maintained in the ON state in accordance with control of the control unit, whereby the cell type power supply device 100 is maintained in the communication possible state (step S26). When the INPUT terminal is at the low level, the control unit switches between ON and OFF of the transmitting/receiving operation in accordance with the signal level of the OUTPUT terminal. When the INPUT terminal is at the low level, and the OUTPUT terminal is at the high level, the output transistor 120 is turned on by the high level of the gate control signal, and the motor 115 is driving. Therefore, the cell type power supply device 100 should be maintained in the communication possible state. Thus, when the INPUT terminal is at the low level (No in step S24), and the OUTPUT terminal is at the high level (Yes in step S25), the transmitting/receiving operation by the wireless communication unit is maintained in the ON state in accordance with control of the control unit, thereby maintaining the cell type power supply device 100 in the communication possible state (step S26). When the INPUT terminal is at the low level, and the OUTPUT terminal is at the low level (or open), the power switch 114 is OFF, and the cell type power supply device 100 should be switched from the communication possible state to the standby state for the sake of reduction of unnecessary power consumption. Therefore, when the INPUT terminal is at the low level (No in step S24), and the OUTPUT terminal is at the low level (No in step S25), the transmitting/receiving operation by the wireless communication unit is switched from ON to OFF in accordance with control of the control unit, thereby switching the state of the cell type power supply device 100 from the communication possible state to the standby state (step S27).

As described in relation to FIG. 11, by the ON/OFF switching control of the transmitting/receiving operation by the control unit as described above, the transmitting/receiving operation can be turned off while the power switch 114 is OFF, and can be turned on while the power switch 114 is ON. Consequently, the cell type power supply device 100 according to the fourth embodiment can use a PWM signal as the gate control signal with fewer parts than the cell type power supply device 100 according to the second embodiment without arranging the OR circuit 131 as done in the second embodiment. Here, the communication function of the cell type power supply device 100 is turned on/off in accordance with ON/OFF of the power switch 114. As described in relation to FIG. 5, however, the communication interval of the cell type power supply device 100 may be changed in accordance with ON/OFF of the power switch 114. For example, shortening the communication interval when the power switch 14 is ON can improve the response speed of the cell type power supply device 100 to the instruction from the external information device 200, and can improve connectivity of the communication with the external information device 200. In addition, prolonging the interval between communications with the external information device 200 in the state where the power switch 114 is OFF can reduce unnecessary power consumption.

The method for controlling the ON/OFF switching of the transmitting/receiving operation by the control unit is not limited to the above. For example, the control unit may refrain from performing the ON/OFF control of the transmitting/receiving operation by the wireless communication unit while a gate control signal is output from the OUTPUT terminal. This enables the cell type power supply device 100 to maintain the state immediately before the gate control signal is output from the OUTPUT terminal, i.e., the communication possible state, even when the output transistor 120 is turned on/off by the gate control signal, and the voltage level of the input signal of the INPUT terminal changes.

Fifth Embodiment

When the motor 115 is used as the load of the external load device 111, the cell type power supply device 100 according to the fifth embodiment can change the direction of the current that flows in the motor 115 of the external load device 111.
(Circuit Configuration)

Figure 13:
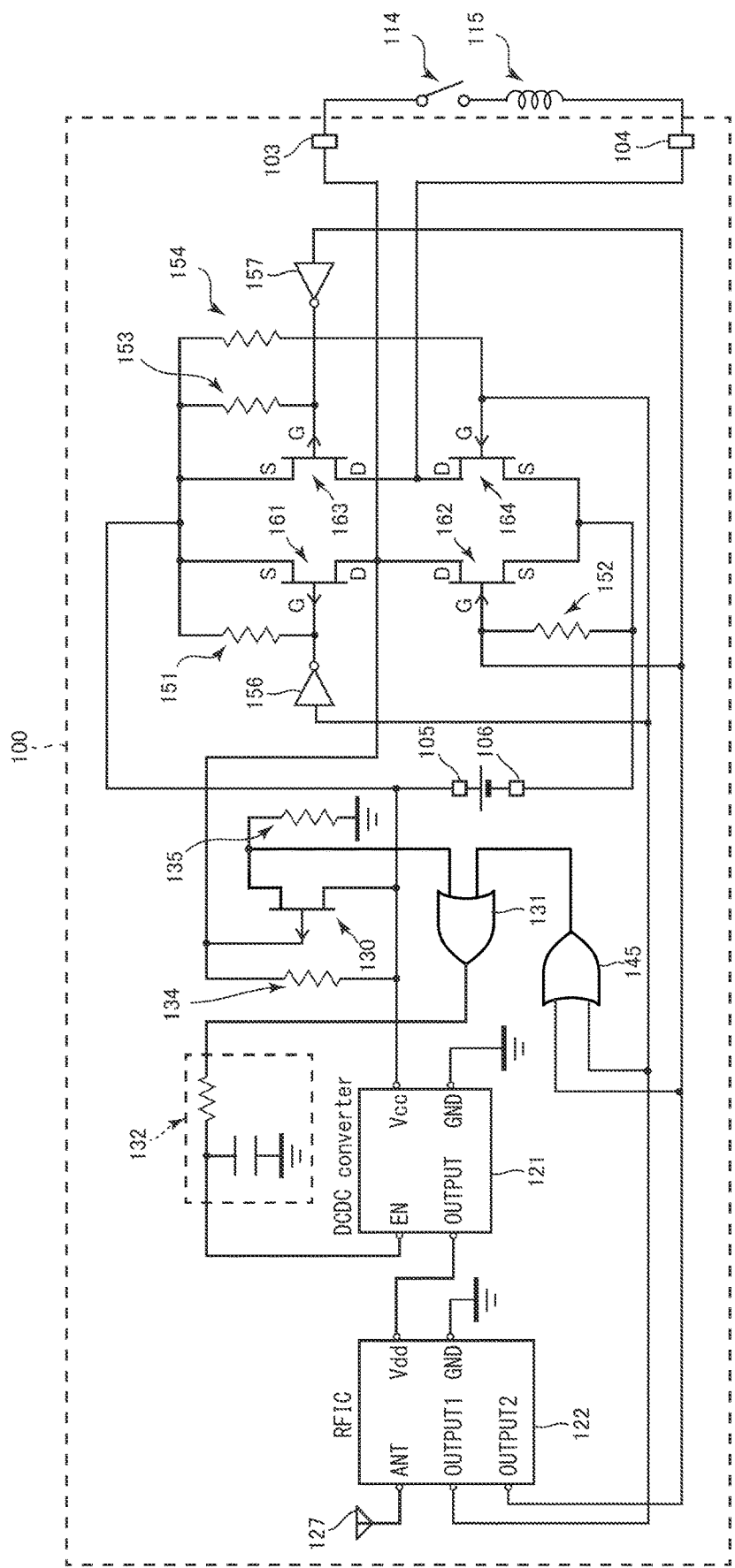
FIG. 13 is an equivalent circuit diagram showing an example of A cell type power supply device according to a fifth embodiment.

FIG. 13 is an equivalent circuit diagram showing an example of the cell type power supply device 100 according to the fifth embodiment. The cell type power supply device 100 according to the fifth embodiment comprises an H bridge circuit 160. The H bridge circuit is provided in parallel with the cell. The H bridge circuit 160 includes four output transistors 161, 162, 163, and 164. The first and third output transistors 161 and 163 are P-channel MOSFETs. The second and fourth output transistors 162 and 164 are N-channel MOSFETs.

The gate terminal of the detection transistor 130 is connected to the outer positive terminal 103. When the power switch 114 is OFF, the gate terminal of the detection transistor is connected to the inner positive terminal 105 via pull-up resister 134 to stabilize the gate terminal of the detection transistor 130 at the high level.

The source terminal of the first output transistor 161 is connected to the inner positive terminal 105, the drain terminal thereof is connected to the outer positive terminal 103, and the gate terminal thereof is connected to an OUTPUT 1 terminal of the RF IC 122 via an inverter 156. When the OUTPUT 1 terminal of the RF IC 122 is open, the gate terminal of the first output transistor 161 is connected to the inner positive terminal 105 via pull-up resister 151 to stabilize the gate terminal of the first output transistor 161 at the high level. When the power switch 114 is OFF, the drain terminal of the first output transistor 161 is connected to the inner positive terminal 105 via pull-up resister 134 to stabilize the drain terminal of the first output transistor 161 at the high level.

The source terminal of the second output transistor 162 is connected to the inner negative terminal 106, the drain terminal thereof is connected to the outer positive terminal 103, and the gate terminal thereof is connected to an OUTPUT 2 terminal of the RF IC 122. When the OUTPUT 2 terminal of the RF IC 122 is open, the gate terminal of the second output transistor 162 is connected to the inner negative terminal 106 via pull-down resister 152 to stabilize the gate terminal of the second output transistor 162 at the low level. When the power switch 114 is OFF, the drain terminal of the second output transistor 162 is connected to the inner positive terminal 105 via pull-up resister 134 to stabilize the drain terminal of the second output transistor 162 at the high level.

The source terminal of the third output transistor 163 is connected to the inner positive terminal 105, the drain terminal thereof is connected to the outer negative terminal 104, and the gate terminal thereof is connected to the OUTPUT 2 terminal of the RF IC 122 via an inverter 157. When the OUTPUT 2 terminal of the RF IC 122 is open, the gate terminal of the third output transistor 163 is connected to the inner positive terminal 105 via pull-up resister 153 to stabilize the gate terminal of the third output transistor 163 at the high level.

The source terminal of the fourth output transistor 164 is connected to the inner negative terminal 106, the drain terminal thereof is connected to the outer negative terminal 104, and the gate terminal thereof is connected to the OUTPUT 1 terminal of the RF IC 122. When the OUTPUT 1 terminal of the RF IC 122 is open, the gate terminal of the fourth output transistor 164 is connected to the inner positive terminal 105 via pull-up resister 154 to stabilize the gate terminal of the fourth output transistor 164 at the high level.

OR circuit 145 is arranged in the preceding stage of the first input terminal of OR circuit 131. The first input terminal of OR circuit 145 is connected to the OUTPUT 1 terminal of the RE IC 122, and the second input terminal thereof is connected to the OUTPUT 2 terminal of the RF IC 122. Accordingly, as long as a gate control signal is output from one of the OUTPUT 1 terminal and the OUTPUT 2 terminal, even though there are two OUTPUT terminals, a high-level gate control signal is output from the OUTPUT 1 terminal or the OUTPUT 2 terminal as in the second embodiment, and regardless of whether the first and fourth output transistors 161 and 164 or the second and third output transistors 162 and 163 are turned on, the state where the transmitting/receiving operation of the cell type power supply device 100 is ON can be maintained. Therefore, a PWM signal can be used as the gate control signal.
(Circuit Operation)

FIG. 14 is a diagram showing a terminal voltage of each transistor which changes in accordance with ON/OFF of the power switch 114 of FIG. 13.

When the power switch 114 is OFF, the first and third output transistors 161 and 163 are OFF as their source terminals are at the high level, and their gate terminals are connected to the inner positive terminal 105 via pull-up resisters 151 and 153 and thus are at the high level. The second output transistor 162 is OFF as its source terminal is at the low level, and its gate terminal is connected to the inner negative terminal 106 via pull-down resister 152 and thus is at the low level. The fourth transistor 164 is ON as its source terminal is at the low level, and its gate terminal is connected to the inner positive terminal 105 via pull-up resister 154 and thus is at the high level. The detection transistor 130 is OFF as its source terminal is at the high level, and its gate terminal is connected to the inner positive terminal 105 via pull-up resister 134 and thus is the high level.

When the power switch 114 is turned on, the gate terminal of the detection transistor 130 is connected to the inner negative terminal 106 via the fourth output transistor 164, and thus is switched from the high level to the low level, thereby turning on the detection transistor 130. As the detection transistor 130 is turned on, the second input terminal of OR circuit 131 reaches the high level, a drive voltage Vdd is supplied from the DC-DC converter 121 to the RF IC 122, the RF IC 122 is driven, and the state of the cell type power supply device 100 is switched from the OFF state to the communication possible state.

The cell type power supply device 100 according to the fifth embodiment receives a code wireless signal relating to a switching instruction about a motor rotation direction from the external information device 200 via the wireless communication unit. When a code wireless signal for rotating the motor forward is received, the gate control signal generated by the control signal generation unit is output from the OUTPUT 1 terminal in accordance with control of the control unit. In contrast, when a code wireless signal for rotating the motor backward is received, the gate control signal generated by the control signal generation unit is output from the OUTPUT 2 terminal in accordance with control of the control unit. When a gate control signal is output from the OUTPUT 1 terminal, the first and fourth output transistors 161 and 164 are turned on/off at the same time. Similarly, when a gate control signal is output from the OUTPUT 2 terminal, the second and third output transistors 162 and 163 are turned on/off at the same time. A gate control signal is not output from the OUTPUT 1 terminal and the OUTPUT 2 terminal at the same time. Accordingly, when the first and fourth transistors 161 and 164 are on, the second and third output transistors 163 are never turned on, and a malfunction of the circuit, and a short circuit etc. can be avoided.

As described above, by keeping one of the four output transistors 161, 162, 163, and 164, here, the fourth output transistor 164, ON with the power switch 114 turned off, the gate terminal of the detection transistor 130 can be switched from the high level to the low level when the power switch 114 is turned on. Namely, keeping one of the four output transistors 161, 162, 163, and 164 ON enables detection of ON/OFF of the power switch 114 by the cell type power supply device 100. Since ON/OFF of the power switch 114 can be detected, even when the cell type power supply device 100 comprises an H bridge control circuit for enabling forward/backward rotation of the motor 115, turning on/off of the communication function of the cell type power supply device 100, and a change of the communication interval etc. can be performed in accordance with ON/OFF of the power switch 114.

The circuit included in the cell type power supply device 100 according to the first to fifth embodiments is a circuit with an external load, an external power supply and a power switch. Therefore, by attaching the circuit of the cell type power supply device 100 in another electric equipment including an external load, an external power supply, and a power switch, the electric equipment can perform a similar operation and produces a similar effect to the cell type power supply device 100 according to the first to fifth embodiments.

While certain embodiments of the present invention have been described, these embodiments have been presented as examples, and are not intended to limit the scope of the invention. Those embodiments may be embodied in a variety of other forms; furthermore, various omissions, substitutions and changes may be made without departing from the spirit of the invention. Those embodiments and modifications fall within the scope and spirit of the invention, and fall within the scope of the claims and their equivalents.

The invention claimed is:

1. A circuit with an external load, a power supply, and a power switch, the circuit comprising:
a power switch detection unit that detects ON/OFF of the power switch;
a circuit cutoff/conduction unit that cuts or allows electrical connection between the external load and the power supply in accordance with a control signal; and
a control unit that generates the control signal in accordance with an RF signal received from an external information device via an antenna,
wherein the control unit changes an interval between communications with the external information device in accordance with ON/OFF of the power switch which is detected by the power switch detection unit, such that the communications are maintained on condition that the interval during the ON of the power switch is shorter than the interval during the OFF of the power switch.

2. An electronic equipment, comprising:
a load;
a power supply box that holds a power supply;
a power switch interposed between the load and the power supply box;
a power switch detection unit that detects ON/OFF of the power switch;
a circuit cutoff/conduction unit that cuts or allows electrical connection between the load and the power supply box in accordance with a control signal; and
a control unit that generates the control signal in accordance with an RF signal received from an external information device via an antenna,
wherein the control unit changes an interval between communications with the external information device in accordance with ON/OFF of the power switch which is detected by the power switch detection unit, such that the communications are maintained on condition that the interval during the ON of the power switch is shorter than the interval during the OFF of the power switch.

* * * * *